(12) United States Patent
Yoo et al.

(10) Patent No.: US 11,749,216 B2
(45) Date of Patent: Sep. 5, 2023

(54) SENSING DEVICE, DISPLAY DEVICE USING THE SENSOR DEVICE, AND CONTROL METHODS THEREOF

(71) Applicant: SAMSUNG ELECTRONICS CO., LTD., Suwon-si (KR)

(72) Inventors: Hojune Yoo, Suwon-si (KR); Minsup Kim, Suwon-si (KR); Kyoungshin Jin, Suwon-si (KR); Jaemyung Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/574,890

(22) Filed: Jan. 13, 2022

(65) Prior Publication Data
US 2023/0056429 A1    Feb. 23, 2023

Related U.S. Application Data

(63) Continuation of application No. PCT/KR2021/015699, filed on Nov. 2, 2021.

(30) Foreign Application Priority Data

Aug. 18, 2021  (KR) ......................... 10-2021-0108806

(51) Int. Cl.
*G09G 3/34*    (2006.01)
*G06F 3/147*    (2006.01)
(Continued)

(52) U.S. Cl.
CPC ............ *G09G 3/3406* (2013.01); *G01J 3/108* (2013.01); *G01J 3/42* (2013.01); *H05B 47/11* (2020.01);
(Continued)

(58) Field of Classification Search
None
See application file for complete search history.

(56) References Cited

U.S. PATENT DOCUMENTS 8,600,075 B2    12/2013    Lim
9,115,988 B2    8/2015    Kihara
(Continued)

FOREIGN PATENT DOCUMENTS

JP    2007-243679 A    9/2007
JP    2011-188220 A    9/2011
(Continued)

OTHER PUBLICATIONS

International Search Report issued in International Application No. PCT/KR2021/015699 dated May 4, 2022.
(Continued)

*Primary Examiner* — Andre L Matthews
(74) *Attorney, Agent, or Firm* — STAAS & HALSEY LLP

(57) ABSTRACT

A display device includes a display, an illuminance sensor, an IR sensor disposed at a lower side of the display device, a memory to store correction data set by respective reflectance, and a processor. The processor is configured to calculate a reflectance of a floor surface, in an environment in which the display device is arranged, based on a sensing value of the IR sensor, obtain correction data corresponding to the calculated reflectance from stored correction data of the memory, correct an illuminance value sensed by using the illuminance sensor according to the obtained correction data, and control an operation of the display based on the corrected illuminance value.

15 Claims, 11 Drawing Sheets

(51) Int. Cl.
*G01J 3/10* (2006.01)
*G01J 3/42* (2006.01)
*H05B 47/11* (2020.01)

(52) U.S. Cl.
CPC ......... *G01J 2003/425* (2013.01); *G06F 3/147* (2013.01); *G09G 2320/0626* (2013.01); *G09G 2330/02* (2013.01); *G09G 2360/144* (2013.01)

(56) References Cited

U.S. PATENT DOCUMENTS

| | | | |
|---|---|---|---|
| 9,241,191 | B2 | 1/2016 | Shim |
| 10,089,062 | B2 | 10/2018 | Lee et al. |
| 10,453,374 | B2 | 10/2019 | Ma |
| 10,778,934 | B2 | 9/2020 | Kang |
| 2009/0067664 | A1 | 3/2009 | Lim |
| 2011/0216930 | A1 | 9/2011 | Kobayashi |
| 2014/0016105 | A1 | 1/2014 | Kihara |
| 2017/0010855 | A1* | 1/2017 | Lee ............ H04R 29/001 |
| 2018/0373395 | A1* | 12/2018 | Kim ............ G01J 1/32 |
| 2020/0296850 | A1 | 9/2020 | Son et al. |

FOREIGN PATENT DOCUMENTS

| | | |
|---|---|---|
| JP | 2014-021166 A | 2/2014 |
| KR | 10-2009-0027101 A | 3/2009 |
| KR | 10-1196410 B1 | 11/2012 |
| KR | 10-2015-0094438 A | 8/2015 |
| KR | 10-2018-0106452 A | 10/2018 |
| KR | 10-2019-0000758 A | 1/2019 |
| KR | 10-2019-0083534 A | 7/2019 |

OTHER PUBLICATIONS

International Written Opinion issued in International Application No. PCT/KR2021/015699 dated May 4, 2022.

* cited by examiner

SENSING DEVICE, DISPLAY DEVICE USING THE SENSOR DEVICE, AND CONTROL METHODS THEREOF

CROSS-REFERENCE TO RELATED APPLICATIONS

This application is a continuation application, under 35 U.S.C. § 111(a) of international patent application No. PCT/KR2021/015699, filed Nov. 2, 2021, which is based on and claims priority under 35 U.S.C. § 119(a) of a Korean Patent Application No. 10-2021-0108806, filed on Aug. 18, 2021, in the Korean Intellectual Property Office, the disclosures of all of which are incorporated by reference herein in its entirety.

BACKGROUND

1. Field

The disclosure relates to a sensor device configured to sense reflected light, a display device configured to control an operating state taking into consideration sensed reflected light, and a control method of an operation of the display device.

2. Description of the Related Art

A display device is a device which displays an image signal received externally. Recent display devices are embedded with a function of adaptively operating brightness or color sense of a screen according to ambient illumination and color temperature.

To this end, most use a digital color sensor. The sensor is designed as structure for measuring ambient light and is typically disposed at a position at which a ceiling or side surface light or the like may be easily measured from an outer surface of the display device.

However, in many cases, recent display devices may be without a bezel part or are thinly configured for a simple aesthetic sense. In this case, because positions for disposing the sensor are not sufficient, the sensors are disposed at a lower end of the display device. With displays such as the above, there is the problem of not only the effect of direct light but also the effect of reflected light increasing with respect to an upper side light because a member of an upper end of the sensor which includes a display performs the role of eaves.

Because reflected light reflects an amount of light differently according to a floor color or material, there is the problem of values sensed from the senor being calculated to different values when the floor color and materials are different even under the same lighting environment.

For example, based on a display device applied with a conversion formula which corrects a sensing value of the sensor based on materials which absorb light well such as a black floor or leather being installed, by the user, in an environment of a material with high light reflectance such as a white table, there is the problem of the illuminance value being recognized in a higher value even through it is same lighting.

SUMMARY

According to an embodiment, a display device includes a display, an illuminance sensor, an IR sensor disposed at a lower side of the display device, a memory to store correction data set by respective reflectance, and a processor. The processor is configured to calculate a reflectance of a floor surface, in an environment in which the display device is arranged, based on a sensing value of the IR sensor, obtain correction data corresponding to the calculated reflectance from the stored correction data of the memory, correct an illuminance value sensed in the illuminance sensor according to the obtained correction data, and control an operation of the display based on the corrected illuminance value.

The IR sensor may include a light emitting device and a light receiving device, the processor may be configured to calculate reflectance of the floor surface by comparing an amount of light projected from the light emitting device to the floor surface with an amount of light incident to the light receiving device, the correction data may be data on an equation to correct a correction parameter determined according to the calculated reflectance and the illuminance value, and the equation may be lux'=a*lux+b (lux representing illuminance value, lux' representing corrected illuminance value, and a and b representing correction parameter determined according to the reflectance).

The processor may be configured to adjust a brightness value of the display based on the corrected illuminance value.

The processor may be configured to turn off the display device based on the corrected illuminance value being as less than or equal to a pre-set threshold while the display device is in a turn on state, and turn on the display device based on the corrected illuminance value exceeding the pre-set threshold while the display device is in a turned off state.

The display device according to an embodiment may further include an audio processor, and the processor may be configured to control, based on the display device being identified as a wall mounted type based on the calculated reflectance, the audio processor to convert an output attribute of sound data in an input content as a first attribute, and control, based on the display device being identified as a stand type based on the calculated reflectance, the audio processor to convert the output attribute of the sound data in the input content as a second attribute.

The display device according to an embodiment may further include a plurality of speakers provided to the display device, and the processor may be configured to output, based on the display device being identified as a wall mounted type according to the calculated reflectance, sound data of an input content through at least a first speaker among the plurality of speakers, and output, based on the display device being identified as a stand type based on the calculated reflectance, sound data of the input content through at least a second speaker of at least one from among the plurality of speakers.

According to an embodiment, a sensor device includes an illuminance sensor disposed to face along a first direction, an IR sensor disposed to face along a second direction which is perpendicular with the first direction, a case configured to support the illuminance sensor and the IR sensor, a connector formed at a side of the sensor device opposite a side from which the IR sensor faces along the second direction. The connector being formed to allow the sensor device to couple to a lower side of an external display device from an outer surface of the case, and an interface configured to transfer, while coupled to the external display device through the connector, a sensing value of the illuminance sensor and a sensing value of the IR sensor to the external display device.

The sensor device according to an embodiment may further include a memory to store correction data set by respective reflectance, and a processor. The processor may be configured to calculate a reflectance of a floor surface, in an environment in which the display device is arranged, based on a sensing value of the IR sensor, obtain correction data corresponding to the calculated reflectance from the stored correction data of the memory, correct an illuminance value sensed in the illuminance sensor according to the obtained correction data, and transfer the corrected illuminance value to the external display device through the interface.

According to an embodiment a control method of a display device includes obtaining an illuminance value by using the illuminance sensor, obtaining a sensing value of an IR sensor disposed at a lower side of the display device, calculating a reflectance of a floor surface, in an environment in which the display device is arranged, based on the sensing value of the IR sensor, obtaining correction data corresponding to the calculated reflectance from among pre-stored correction data and correcting the illuminance value obtained by using the illuminance sensor according to the obtained correction data, and controlling an operation of the display device according to the corrected illuminance value.

The calculating the reflectance of the floor surface may include calculating the reflectance of the floor surface by comparing an amount of light projected from a light emitting device to the floor surface from among the IR sensor with an amount of light incident to a light receiving device from among the IR sensor, the correction data may be data on an equation to correct a correction parameter determined according to the calculated reflectance and the illuminance value, and the equation may be lux'=a*lux+b (lux representing illuminance value, lux' representing corrected illuminance value, and a and b representing correction parameter determined according to the reflectance).

The controlling an operation of the display device may include adjusting a brightness value of the display based on the corrected illuminance value.

The controlling an operation of the display device may include turning off the display device based on the corrected illuminance value being less than or equal to a pre-set threshold while the display device is in a turn on state, and turning on the display device based on the corrected illuminance value exceeding the threshold while the display device is in a turned off state.

The control method of the display device according to an embodiment may further include converting an output attribute of sound data in an input content as a first attribute based on the display device being identified as a wall mounted type based on the calculated reflectance, and converting the output attribute of the sound data in the input content as a second attribute based on the display device being identified as a stand type based on the calculated reflectance.

According to an embodiment, a control method of an operation of a computer readable recording medium storing a program to execute a control method of an operation of a display device includes obtaining an illuminance value by using an illuminance sensor, obtaining a sensing value of an IR sensor disposed at a lower side of the display device, calculating a reflectance of a floor surface, in an environment in which the display device is arranged, based on the sensing value of the IR sensor, obtaining correction data corresponding to the calculated reflectance from among pre-stored correction data, and correcting the illuminance value obtained by using the illuminance sensor according to the obtained correction data, and controlling an operation of the display device according to the corrected illuminance value.

The calculating the reflectance of the floor surface may include calculating the reflectance of the floor surface by comparing an amount of light projected from a light emitting device to the floor surface from among the IR sensor with an amount of light incident to a light receiving device from among the IR sensor, the correction data may be data on an equation to correct a correction parameter determined according to the reflectance and the illuminance value, and the equation may be lux'=a*lux+b (lux representing illuminance value, lux' representing corrected illuminance value, and a and b representing correction parameter determined according to the reflectance).

According to various embodiments of the disclosure as described above, an error in sensing value of a sensor to identify an arrangement environment of a display device may be corrected by accurately recognizing an effect by light reflected from a floor surface.

DETAILED DESCRIPTION

Embodiments described herein have been provided as an example to assist in the understanding of the disclosure, and unlike the embodiments described herein, it should be understood that various changes and modifications may be made to the disclosure. However, in describing the embodiments, in case it is identified that detailed description of related known technologies may unnecessarily confuse the gist of the disclosure, the detailed description will be omitted. Further, the accompanied drawings may be illustrated so that sizes of some elements are exaggerated rather than illustrated to its actual scale for convenience of description.

Terms used in describing the various embodiments of the disclosure are general terms selected considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted to the meaning defined herein, and if there is no specific meaning of the term defined, it may be interpreted based on the overall context of the disclosure and the technical common sense according to the related art.

Further, because the elements necessary in describing the respective embodiments of the disclosure are described, the disclosure is not necessarily limited hereto. Accordingly, some elements may be changed or omitted, and other elements may be added. In addition, the elements may be distributed and disposed in devices independent from one another.

Furthermore, although the embodiments of the disclosure have been described in detail with reference to the accompanying drawings and the descriptions disclosed in the accompanying drawings, the disclosure is not limited by or limited to the embodiments.

Aspects of the disclosure are to address at least the above-mentioned problems and/or disadvantages and to provide at least the advantages described below. Accordingly, an aspect of the disclosure is to provide a display device capable operating by accurately recognizing an effect by light reflected on a floor surface to correct an error in a sensing value of a sensor for identifying an arrangement environment of the display device and a control method thereof.

Another aspect of the disclosure is to provide a sensor device coupled to one side of the display device to measure the reflected light and a control method thereof.

The disclosure will be described in greater detail below with reference to the accompanied drawings.

Figure 1:
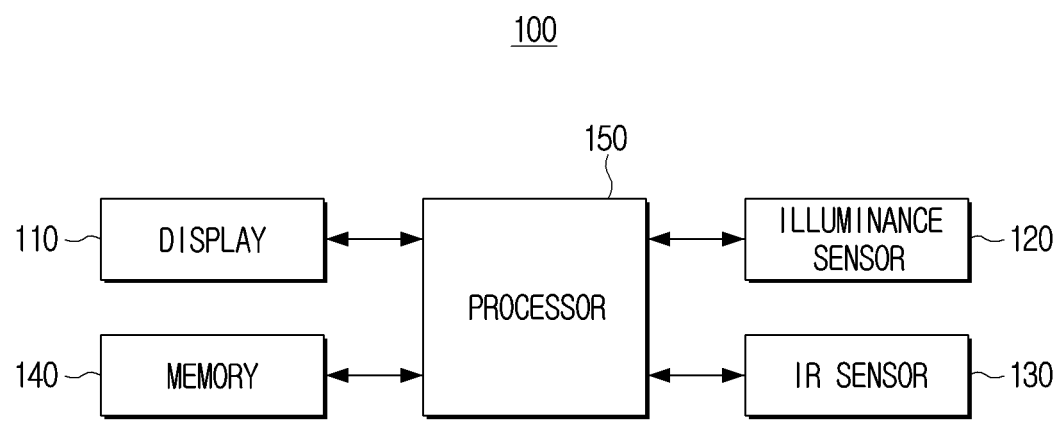
FIG. 1 is a block diagram illustrating a configuration of a display device according to an embodiment.

FIG. 1 is a block diagram illustrating a configuration of a display device 100 according to an embodiment.

Referring to FIG. 1, the display device 100 according to an embodiment may include a display 110, an illuminance sensor 120, an IR sensor 130, a memory 140, and a processor 150.

The display 110 may be a configuration of displaying an image, and may be realized as a display of various types such as, for example, and without limitation, a Liquid Crystal Display (LCD), an Organic Light Emitting Diode (OLED) display, Light Emitting Diodes (LED), a Plasma Display Panel (PDP), Quantum dot light-emitting diodes (QLED), and the like, but is not limited thereto.

The illuminance sensor 120 may be a sensor configured to sense illuminance of the surroundings of the display device 100. The illuminance sensor 120 may be realized as an integrated sensor capable of sensing both illuminance and color, and in addition thereto, may be realized to various types so long as it is capable of sensing illuminance.

The IR sensor 130 may refer to a sensor using an Infra Red (IR) signal. The IR sensor 130 may be configured as a light emitting device 131 and a light receiving device 132. The IR sensor 130 may be configured to sense the amount of light received compared to the amount of light irradiated, and the light emitting device may be realized as an IR LED and the light receiving device may be realized as a photodiode, but is not limited thereto.

The memory 140 may be electrically connected with the processor 150, and may be configured to store at least one data or instruction necessary for the various embodiments.

In addition, the memory 140 may be realized as a non-volatile memory, a volatile memory, or the like, and may be realized as an embedded memory included in the processor 150 or as a memory separate from the processor 150.

The processor 150 may be configured to control the overall operation of the display device 100 according to the various embodiments. The processor 150 may be configured to perform various operations based on data or instructions stored in the memory 140.

The processor 150 may be realized as a digital signal processor (DSP) configured to process digital signals, a microprocessor, and a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 150 may be realized as a System on Chip (SoC) embedded with a processing algorithm or large scale integration (LSI), and may be realized in the form of a field programmable gate array (FPGA)

Figure 2:
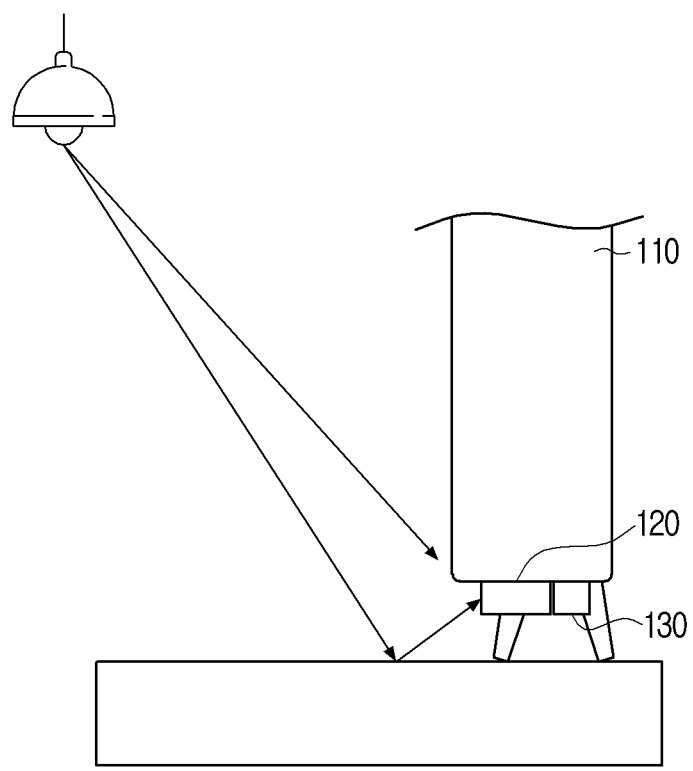
FIG. 2 is a diagram illustrating an example of a display device configured such that a sensor is positioned at a lower end of a display.

FIG. 2 is a diagram illustrating a state in which the illuminance sensor 120 and the IR sensor 130 are positioned at a lower end of the display device 100.

Based on the illuminance sensor 120 being positioned at the lower end of the display device 100, not only light directly incident from a light source, but even reflected light which is reflected from the floor surface may be sensed.

Accordingly, an accurate illuminance value may be calculated when the illuminance value sensed in the illuminance sensor 120 is appropriately corrected taking into consideration the effect by the reflected light.

In the above-described embodiment, the illuminance sensor 120 and the IR sensor 130 have been described as being disposed outside of the display device 100, but the illuminance sensor 120 and the IR sensor 130 may also be disposed inside of the display device 100.

Figure 3:
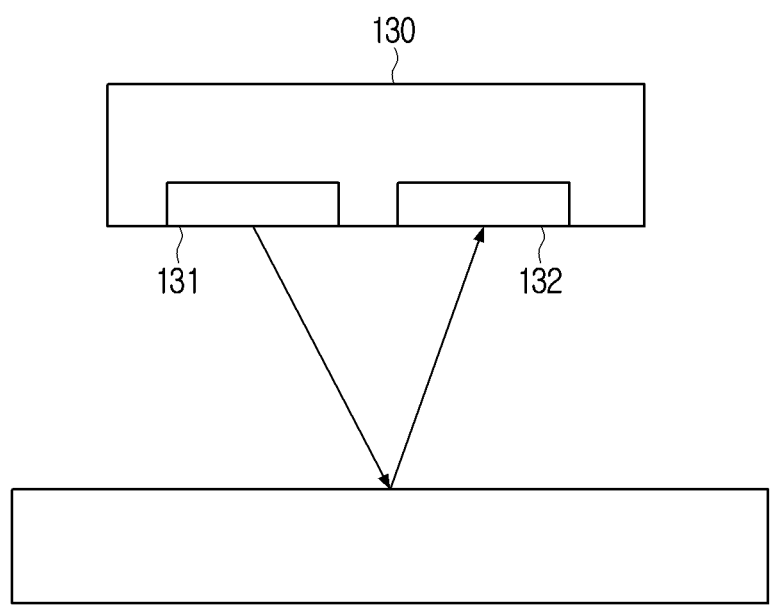
FIG. 3 is a diagram illustrating an example of an IR sensor.

FIG. 3 is a diagram illustrating an example of the IR sensor 130.

The IR sensor 130 may be configured including the light emitting device 131 and the light receiving device 132.

The light emitting device 131 may be a device configured to project light by converting electricity to light, and may be realized as an IR LED, and the like.

The light receiving device 132 may be a device configured such that electromotive force is generated when light is irradiated, and may be realized as a photodiode, and the like.

The IR sensor 130 is generally used for the purpose of sensing a distance with an external object, or sensing whether an external object is in approach, but in the embodiment, the display device 100 may be configured to calculate a reflectance of the floor surface by using the IR sensor 130.

Specifically, the processor 150 may be configured to calculate the reflectance of the floor surface by comparing the amount of light projected from the light emitting device 131 of the IR sensor 130 to the floor surface, and the amount of light of the light incident to the light receiving device 132 as in FIG. 3.

The processor 150 may be configured to identify, by calculating the reflectance of the floor surface on which the display device 100 is installed based on the sensing value of the IR sensor 130, the environment in which the display device 100 is installed. The processor 150 may be configured to control an operation of the display 110 according to an installation environment of the identified display device 100. Table 1 below may be an example of identifying the installation environment of the display device 100 according to the sensing value of the IR sensor 130. Although specific values measured according to the type of the sensor may vary, the measured value in an environment (white floor surface, glossy wood surface, etc.) with high reflectance according to the floor surface may be measured relatively several times to tens of times higher than the measured value in an environment (black floor surface, leather surface, etc.) with low reflectance.

TABLE 1

| IR sensor sensing value | installation environment (floor surface color) |
| --- | --- |
| 0 | no floor surface (wall mounted type) |
| 100 to 300 | black floor surface |
| greater than or equal to 1000 | white floor surface |

The memory 140 according to an embodiment may be configured to store correction data. The correction data may be stored matched by the respective reflectance, or stored matched by the respective installation environment information of the display according to the reflectance. The processor 150 may be configured to obtain correction data corresponding to the reflectance calculated by using the IR sensor 130 from the memory 140, and correct the illuminance value sensed in the illuminance sensor 120 by using correction data.

The correction data may refer to various data provided to correct the illuminance value. In an example, the correction data may include data on an equation to correct a correction parameter determined according to the reflectance and the illuminance value sensed in the illuminance sensor 120.

The equation may be configured as a linear type such as lux'=a*lux+b. Here, lux may refer to the illuminance value, lux' may refer to the corrected illuminance value, and a and b may refer to the correction parameter determined according to the reflectance.

The processor 150 may be configured to control, based on the corrected illuminance value, the overall operation of the display device 100. According to an embodiment, the processor 150 may be configured to adjust an output attribute of the display 110 based on the corrected illuminance value. Specifically, if the corrected illuminance value is high, a brightness value may be raised so that the user may better identify a screen. On the other hand, if the corrected illuminance value is low, the brightness value may be lowered to prevent glare. The processor 150 may be configured to adjust at least one from among the various output attributes such as color temperature, output frequency, saturation, contrast, sharpness, background color, output mode, and resolution in addition to the brightness value.

According to another embodiment, the processor 150 may be configured to control an on/off state of the display device 100 based on the corrected illuminance value. For example, the display device 100 may be realized as an electronic picture frame device. Because turning on the lighting is common when the user enters indoors, a presence or an absence of the user may be estimated according to whether the lighting is turned on. Accordingly, the processor 150 may be configured to turn off the display device 100 based on the corrected illuminance value being calculated as less than or equal to a pre-set threshold in a state in which the display device 100 is turned on. The threshold may be set to a minimum illuminance value of when lighting is in an turned on state.

On the other hand, while the display device 100 is in a turned off state, the processor 150 may be configured to turn on the display device 100 based on identifying that the corrected illuminance value exceeded the threshold. The electronic picture frame is generally hung on a wall and viewed in an indoor environment such as a room, a living room, or an office. In this case, there is no need particularly keep the electronic picture frame on if there is no user present.

Here, the turned on state may refer to a state in which power is supplied to the respective elements of the display device 100 and is functioning. The turned off state may refer to a state in which the processor 150 or an auxiliary processor is functioning so that the illuminance sensor 120, IR sensor 130, and the memory 140 may function, or a state in which power is shut off to only the display 110 which consumes significant power from among the configurations of the display device 100. The turned off state may be alternatively designated as an inactivated state, standby state, power saving mode state, or the like, but will be collectively referred to as the turned off state and described herein.

Information on the threshold may be stored in the memory 140. The threshold may be differently set according to the environment the display device 100 is installed. For example, in the case of the display device 100 which is installed in an environment with many windows and a bright colored floor, illuminance may be high even when the lighting is in a turned off state. In this case, the threshold which may be a criterion for identifying whether lighting is in a turned off state may be set relatively high. On the other hand, in case it is in an environment without windows and dark color floors, illuminance may significantly decline when lighting is turned off. In this case, the threshold may be set low. In the above-described embodiment, although the illuminance sensor 120 and the IR sensor 130 have been described as positioned at the lower end of the display 110, the illuminance sensor 120 and the IR sensor 130 may be positioned at the side surface or the upper end of the display 110.

In this case, the IR sensor 130 may be configured to measure the reflectance of a wall surface or a ceiling.

Based on the IR sensor 130 being installed on the floor surface, the display device 100 may be configured to identify whether the display device 100 is a wall mounted type or a stand type based on the reflectance. The display device 100 may be configured to adjust an audio output characteristic according to whether it is a wall mounted type or a stand type.

Figure 4:
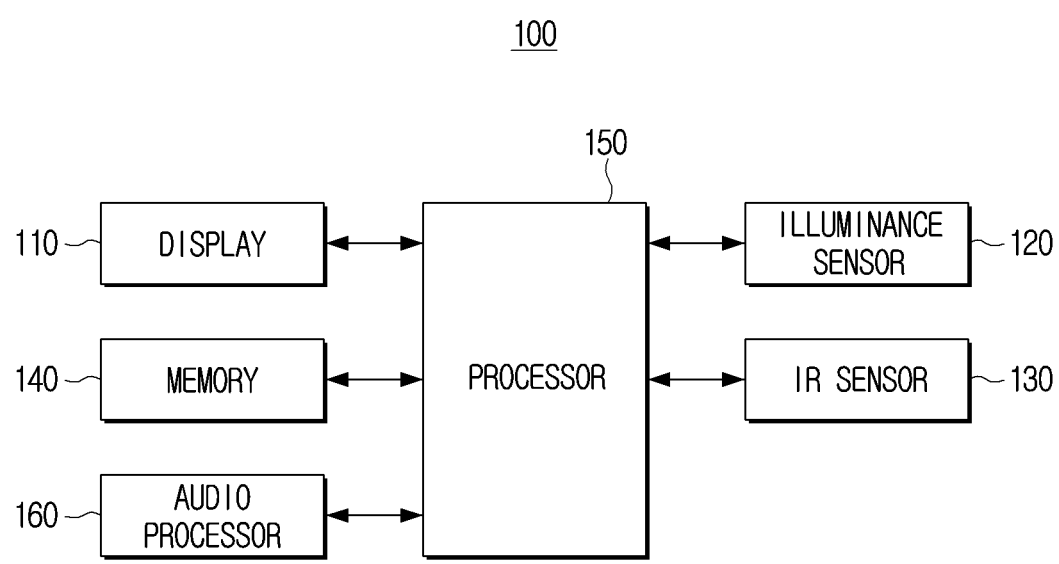
FIG. 4 is a block diagram of a display device illustrating various embodiments.

FIG. 4 is a drawing illustrating an example of a block diagram illustrating the display device 100 according to the various embodiments. Referring to FIG. 4, the display device 100 may include the display 110, the illuminance sensor 120, the IR sensor 130, the memory 140, the processor 150, and an audio processor 160. Because the display 110, the illuminance sensor 120, and the IR sensor 130 parts are similar with the description described in FIG. 1, redundant descriptions will be omitted.

The audio processor 160 may be an element for processing audio data included in the input content. The audio processor 160 may be configured to decode, after de-multiplexing audio data from the input content, the audio data and convert to a type of audio signal which may be output. The audio signal may be output through a speaker provided in the display device 100.

The audio processor 160 may be configured to convert, according to the control of the processor 150, an output attribute of sound data. The converting the output attribute may involve converting a frequency characteristic of sound data or converting volume, and may include a task of emphasizing or reducing a specific frequency band, or the like.

The processor 150 may be configured to identify whether the display device 100 is a wall mounted type or a stand type based on the calculated reflectance. If it is a wall mounted type, the amplitude of the reflected light may become smaller because the distance from the lower part to the floor surface is relatively farther than a stand type. The processor 150 may be configured to compare a specific threshold and reflectance to identify if it is a wall mounted type based on the reflectance being smaller than the threshold, and identify if it is a stand type based on the reflectance being greater than or equal to the threshold. The threshold referred here is unrelated to the threshold for identifying whether lighting is turned on/off in the embodiment described above, and may be measured through a separate test and stored in the memory 140.

The processor 150 may be configured to control, based on being identified as a wall mounted type, the audio processor 160 to convert the output attribute of volume data in the input content as a first attribute. In addition, the processor 150 may be configured to control, based on the display device 100 being identified as a stand type based on the calculated reflectance, the audio processor 160 to convert the output attribute of sound data in the input content as a second attribute.

The wall mounted type may refer to a type in which the display device is installed by fixing a frame which fixes the display device 100 to a wall, a type in which the display device 100 is installed to an easel-type stand, or the like, but is not limited thereto, and may be formed in a method of a lower side of the display 110 being installed spaced apart from the floor surface.

The stand type may refer to a type in which the display device 100 is vertically set up and installed to a top surface of the floor surface, a table, or the like. Because the lower side of the display device 100 is closely installed with the floor surface in the stand type, the effect of the reflected light by the floor surface may appear greater than the wall mounted type.

The first attribute may be an attribute set such that sound is richly transferred through space while the display device 100 is installed as a wall mounted type. The second attribute may refer to an attribute set such that sound is richly transferred through space while the display device 100 is installed as a stand type. In the case of the wall mounted type, because it is hung on the wall in a considerably distanced state from the floor, there may be many instances where it is installed at a position higher than the height of where the ears of the user are positioned, and the distance from the user may be farther than the stand type. Thus, the first attribute may set the volume to be greater than the second attribute, that is, the stand type, and a location of a virtual sound source may also be set based on the position of a head and height of the user. The second attribute may also appropriately set the volume or output frequency, location of the virtual sound source, and the like based on the distance with, or the position of the head and height, and the like of the user.

Figure 5:
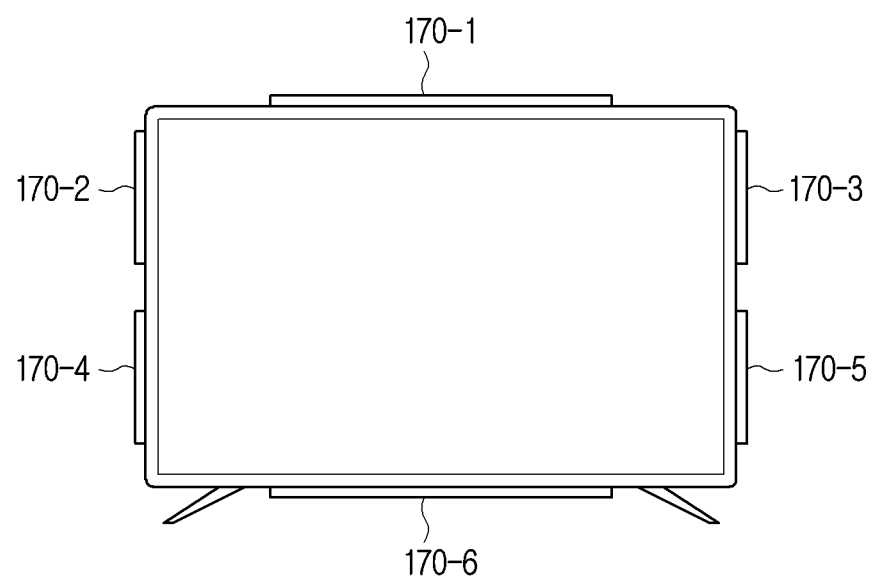
FIG. 5 is a diagram illustrating an example of a display device including a plurality of speakers.

FIG. 5 is a diagram illustrating an example of the display device 100 including a plurality of speakers 170-1 to 170-6.

The speaker may be an element for outputting a sound signal of the display device 100 to the outside. For a rich sound effect, the display device 100 may include the plurality of speakers 170-1 to 170-6. The plurality of speakers 170-1 to 170-6 may be disposed at a top, bottom, left and right side surfaces, a back surface, or the like of the display device 100.

In the embodiment, the plurality of speakers 170-1 to 170-6 may be realized as embedded speakers of the display device 100, but the embodiment is not limited thereto, and the speakers may be realized as separately connected external speakers.

The processor 150 may be configured to determine the speakers for outputting the sound signal from among the plurality of speakers 170-1 to 170-6 based on the reflectance.

In an example, the processor 150 may be configured to output through the speakers 170-4 to 170-6 disposed at the lower side from among the plurality of speakers 170-1 to 170-6 based on the display device 100 being identified as a wall mounted type based on the calculated reflectance.

On the other hand, the processor 150 may be configured to output sound data of the input content through the speakers 170-1 to 170-3 disposed at the top side from among the plurality of speakers 170-1 to 170-6 based on the display device 100 being identified as a stand type based on the calculated reflectance.

A method of selecting the speaker may be variously modified according to an embodiment. For example, when it is a stand type, the processor 150 may be configured to output by using all of the plurality of speakers 170-1 to 170-6, and when it is a wall mounted type, control to output by using the speakers except for the upper part speaker 170-1. In addition thereto, the number and arrangement location of speakers may be variously set according to the size and type of the product, and the processor 150 may be configured to control the speakers to output the sound signal based on some from among the speakers being activated according to an installation environment or method of the display device 100.

As described above, the illuminance sensor and the IR sensor may be disposed at the lower side of the display device 100, and may be used as a type which is embedded inside of a case of the display device 100, or as a type which is separately manufactured and coupled to the lower part of the display device 100

Figure 6:
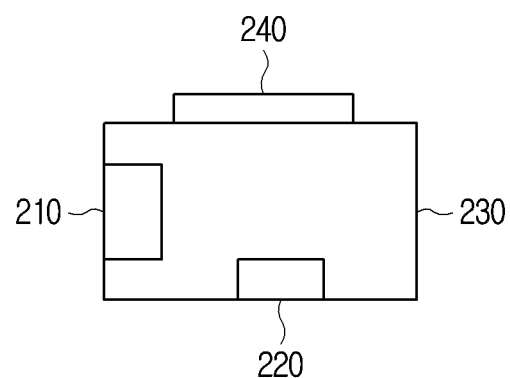
FIG. 6 is a diagram illustrating an example of a configuration of a sensor device.

FIG. 6 is a diagram illustrating an example of a configuration of a sensor device 200 to be coupled and used with the display device. The sensor device 200 may include an illuminance sensor 210 disposed toward a first direction, an IR sensor 220 disposed toward a second direction, a case 230 configured to support the illuminance sensor 210 and the IR sensor 220, and a connector 240 configured to couple the sensor device 200 to a lower side of an external display device from an outer surface of the case 230.

The first direction and the second direction may set to be perpendicular. The user may use the connector 240 so that the first direction faces toward a front, and the second direction faces toward the floor of the display device 100 and may couple the sensor device 200 to a lower part surface of the display device 100.

The case 230 may be realized by using a material with high IR transmittance, or by using a transparent material or piercing holes to fit the positions of the light emitting device and the light receiving device of the IR sensor 220.

The connector 240 may be an element for coupling to an outer surface of the display device 100. The connector 240 may be formed at a side in opposite direction of the second direction to which the IR sensor 220 is facing from the outer surface of the case 230, but the embodiment is not limited thereto, and may be realized by being formed at a side in perpendicular direction with both the first direction and the second direction to couple the sensor device 200 to the side surface of the external display device.

The connector 240 may be formed with a pin inside and realized as a type capable of connecting to a connection port of the display device 100, but is not necessarily limited thereto. For example, based on a groove type recess being installed to the outer surface of the display device 100, the connector 240 may be realized as a fastening structure of a type which is fastened in a sliding method in the recess. Alternatively, based on the outer surface of the display device 100 being of a metal material, the connector 240 may be realized as a magnetic material which couples to the outer surface by magnetic force. In addition thereto, the connector 240 may be manufactured to various structures.

Although not illustrated in FIG. 6, the sensor device 200 may include an interface.

The interface may be an element for transferring the sensing values of the illuminance sensor 210 and the IR sensor 220 to the external display device. The interface may be configured to perform communication with the external display device according to communication methods of various types. For example, the interface may include a WI-FI module, a Bluetooth module, an infrared communication module, a wireless communication module, and the like. The WI-FI module and the Bluetooth module may perform communication through a WI-FI method and a Bluetooth method, respectively, and the wireless communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like in addition to the communication methods described above.

In addition to the above, the interface may be realized as a wired interface which is directly connected with the display device through the pin embedded in the connector 240, or may be realized as other various wired communication interfaces.

Based on the sensor device 200 being manufactured as an independent device as in FIG. 6, the user may use the sensor device 200 by connecting to the display device of the related art. In this case, a firmware of the processor which controls the display device may be updated, or operations described in the various embodiments described above may also be performed in the display device of the related art by downloading a dedicated application.

Although the sensor device 200 has been illustrated as including sensors and transferring the sensing values to the display device, and the display device using the sensing values to calculate reflectance, correcting the illuminance value, and then performing various operations based on the value in FIG. 6, if a memory and a processor is added to the sensor device 200, the above-described operation may be directly performed. Specifically, the sensor device 200 may be configured to directly calculate reflectance and provide to the display device. Alternatively, the illuminance value may be directly corrected and provided to the display device, and a control signal for adjusting the output attribute may be directly provided to the display device. In this case, even if the process of installing a separate application or updating the firmware is not performed in the display device, operations according to the various embodiments described above may be performed.

Figure 7:
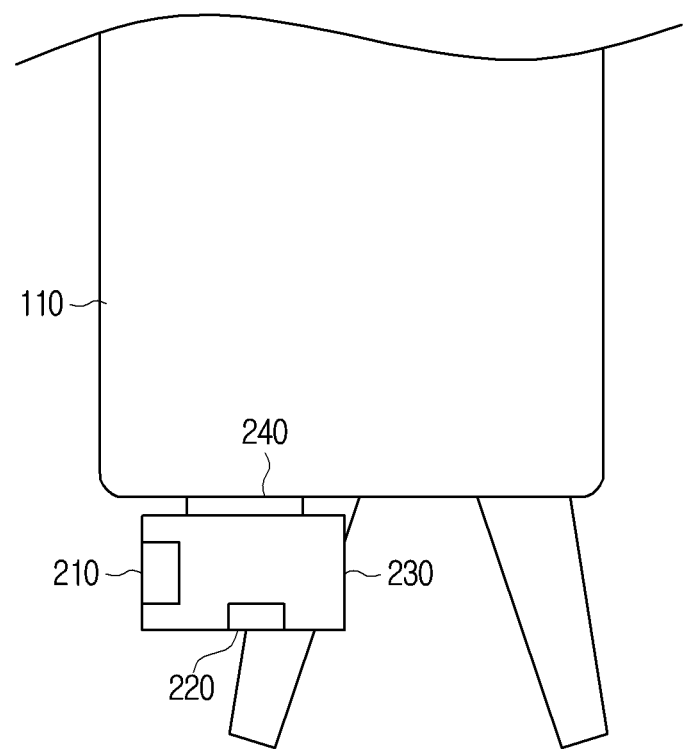
FIG. 7 is a diagram illustrating an example of a sensor device coupled to a lower side of an external display.

FIG. 7 is a diagram illustrating an example of the sensor device 200 coupled to the lower side of the external display 110.

The sensor device 200 according to an embodiment may be realized so as to be coupled to the lower end of the external device 110, but is not limited thereto, and may be realized so as to be coupled to the side surface or the upper end of the external display 110.

Figure 8:
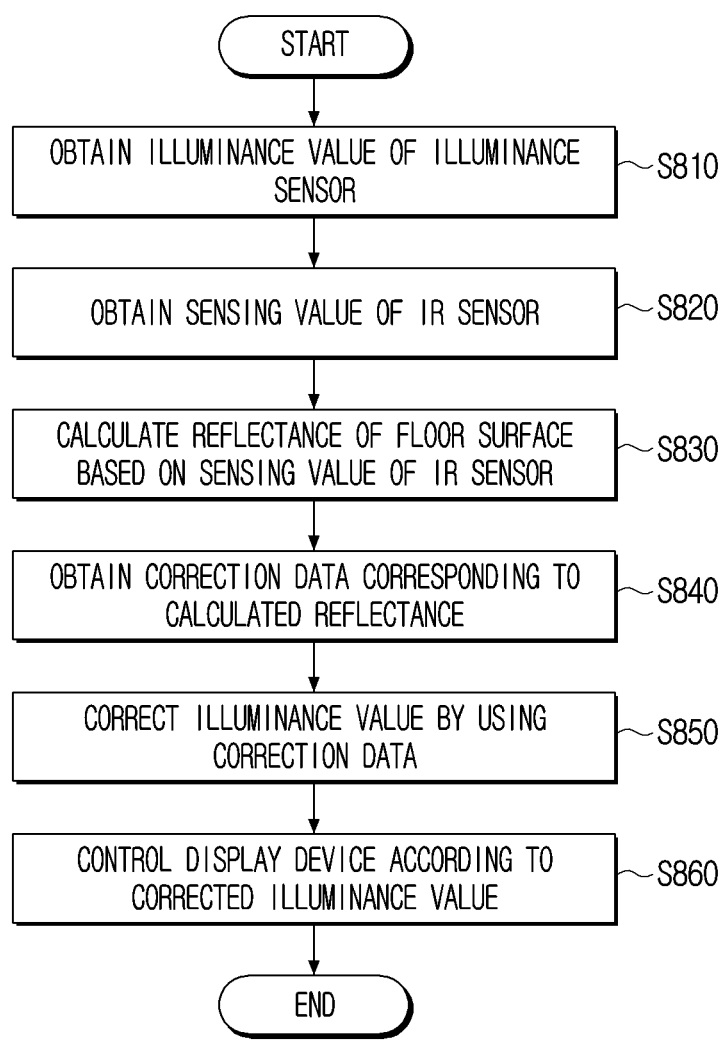
FIG. 8 is a flowchart illustrating a control method of an operation of a display device according to an embodiment.

FIG. 8 is a flowchart illustrating a control method of the display device 100.

Referring to FIG. 8, the display device 100 may include obtaining the illuminance value by using the illuminance sensor 120 (S810), obtaining the sensing value of the IR sensor 130 disposed at the lower side of the display device 100 (S820), calculating the reflectance of the floor surface based on the sensing value of the IR sensor 130 (S830), obtaining correction data corresponding to the calculated reflectance from among pre-stored correction data (S840), correcting the illuminance value obtained in the illuminance sensor 120 by using the obtained correction data (S850), and controlling the operation of the display device 100 according to the corrected illuminance value (S860). The controlling the operation may be realized to the type in which the output attribute is adjusted, the audio processing method is converted, or the output speaker is variously selected as described in the various embodiments described above.

In addition, the calculating the reflectance of the floor surface (S830) may be realized to calculate the reflectance of the floor surface by comparing the amount of light of the light projected from the light emitting device 131 to the floor surface from among the IR sensor 130 and the amount of light of the light incident to the light receiving device 132 from among the IR sensor 130.

The correction data may include data on the equation for correcting the correction parameter determined according to the reflectance and the illuminance value. Here, the equation may be realized as a linear type equation of $lux'=a*lux+b$ (lux represents illuminance value, lux' represents corrected illuminance value, and a and b represent correction parameter determined by reflectance).

The controlling the operation of the display device 100 according to the corrected illuminance value (S860) may be realized by adjusting the brightness value or adjusting the color temperature, or the like of the display 110 based on the illuminance value corrected according to an embodiment, and the embodiment is not limited thereto.

Figure 9:
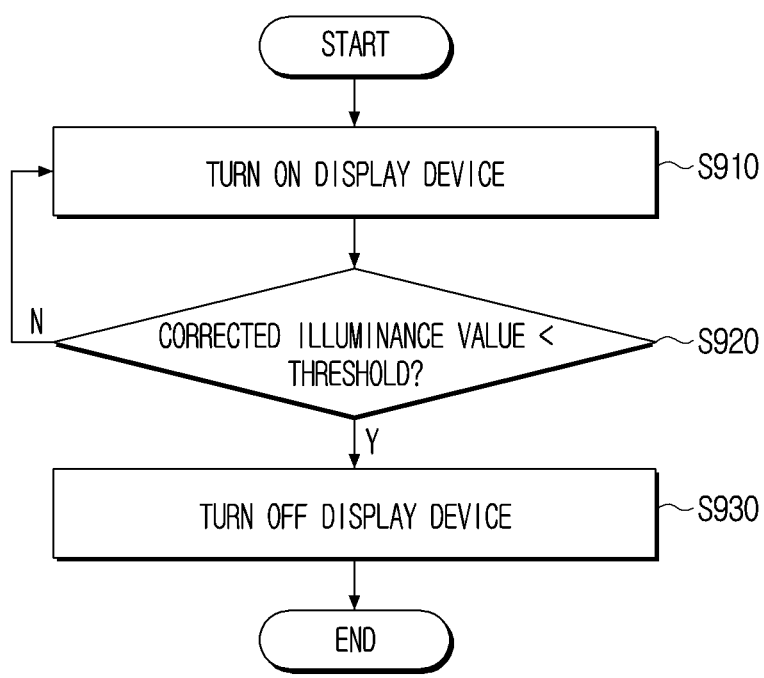
FIG. 9, FIG. 10 and FIG. 11 are flowcharts illustrating a control method of an operation of a display device according to various embodiments.
Figure 10:
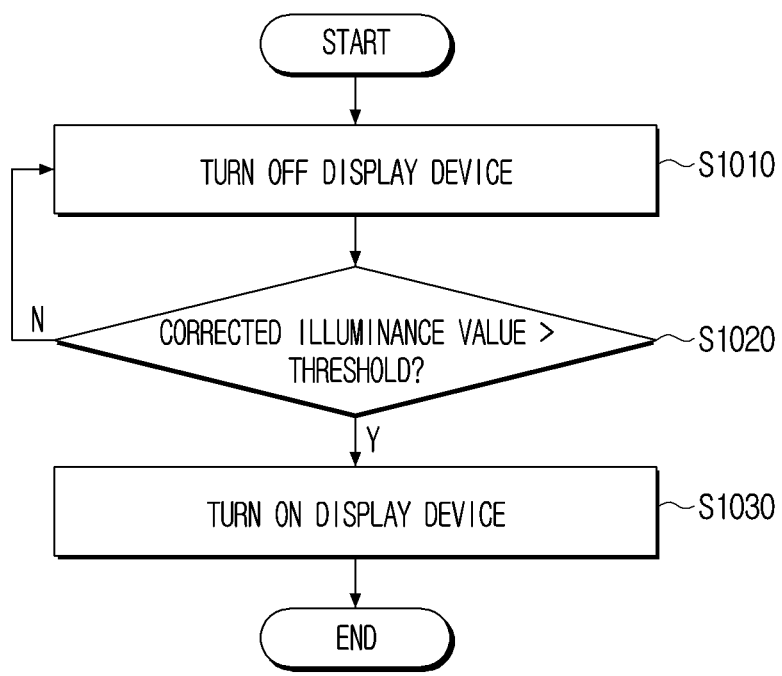

FIG. 9 and FIG. 10 are flowcharts illustrating an example of the control method of the display device 100.

Referring to FIG. 9 and FIG. 10, the controlling the operation of the display device 100 (S860) may be realized to turn off the display device 100 (S930) based on the corrected illuminance value being calculated as less than or equal to a pre-set threshold (S920) while the display device 100 is in the turned on state (S910), and additionally, may be realized to turn on the display device (S1030) based on the corrected illuminance value exceeding the threshold (S1020) while the display device 100 is in the turned off state (S1010).

Through controlling the operation of the display device 100, the display device 100 may be turned off to prevent power wastage when the illuminance of the surrounding environment is less than or equal to the threshold, and the display device 100 may be turned on to automatically operate again based on the illuminance of the surrounding environment exceeding the threshold while in the turned off state.

Figure 11:
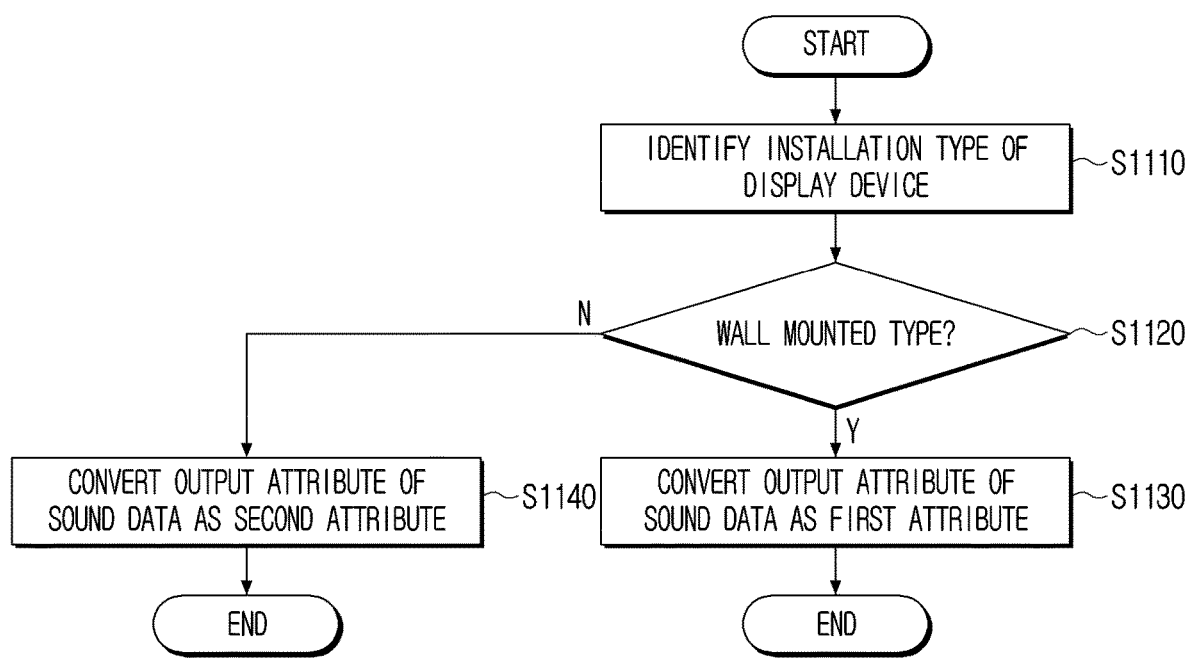

FIG. 11 is a flowchart illustrating an example of the control method according to an installation type of the display device 100.

The controlling the operation of the display device 100 (S860) may be realized to convert the output attribute of sound data in the input content, and converting the output attribute may involve converting various attributes such as the frequency characteristic, volume, or the like of sound data, may be realized to emphasize or reduce a specific frequency band. The identifying an installation type (S1110) in FIG. 11 may be carried out in the method of comparing the calculated reflectance with the threshold. Based on the reflectance being lower than the threshold by comparing with the threshold, the display device 100 may be identified as the wall mounted type (S1120). Accordingly, the output attribute of volume data in the input content may be converted as the first attribute (S1130). On the other hand, based on the reflectance being higher than the threshold, the display device 100 may be identified as the stand type. Accordingly, the display device 100 may convert the output attribute of sound data in the input content as the second attribute (S1140). Because the example of the first attribute and the second attribute has been described above, redundant description will be omitted.

The control methods of the operation described in FIG. 8 to FIG. 11 may be performed in the display device which includes the configurations in FIG. 1 and FIG. 4, but is not necessarily limited thereto. That is, the control methods of the operation described above may even be performed in the display device which includes configurations not illustrated in FIG. 1 and FIG. 4, or where some elements are omitted or modified.

In addition, in FIG. 2 and FIG. 6, the sensor device 200 has been described as a type which is attached to the lower part of the display device, but the sensor device may be realized as a type embedded to the display device.

In addition, in the various embodiments described above, although the illuminance sensor has been described as being disposed to face the front surface of the display device and the IR sensor has been described as being disposed to face the lower surface, if it is a structure is such that disposing the illuminance sensor to face the front surface is difficult, the illuminance sensor may also be disposed aligned with the IR sensor to face the lower surface. In this case, because the effect of the reflected light is reflected even greater to the value sensed in the illuminance sensor, the correction data according to reflectance may be differently set.

In the embodiment described above, the illuminance sensor 120 and the IR sensor 130 have been described as being positioned at the lower end of the display 110, but the illuminance sensor 120 and the IR sensor 130 may be positioned at the side surface or the upper end of the display 110.

In this case, the IR sensor 130 may be realized as measuring the reflectance of the wall surface or the ceiling.

The methods according to the various embodiments of the disclosure as described above, may be realized as an application type which is installable in the display device of the related art.

In addition, the methods according to the various embodiments of the disclosure as described above, may be realized with only a software upgrade or a hardware upgrade on the display device of the related art.

In addition, the various embodiments of the disclosure as described above may be performed through an embedded server provided in the electronic device, or an external server of the display device.

According to an embodiment, the methods according to the various embodiments described above may be provided included in a computer readable recording medium. A computer program product may be distributed as a type of a machine-readable storage medium or distributed online through an application store.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display device, comprising:
   a display;
   an illuminance sensor;
   an IR sensor disposed at a lower side of the display device, the IR sensor comprising a light emitting device and a light receiving device;
   a memory to store correction data set by respective reflectance; and
   a processor configured to:
      calculate a reflectance of a floor surface, in an environment in which the display device is arranged, based on light projected from the light emitting device to the floor surface and light incident to the light receiving device,
      obtain correction data corresponding to the calculated reflectance from stored correction data in the memory,
      correct an illuminance value obtained from sensing by the illuminance sensor according to a correction parameter corresponding to the calculated reflectance in the obtained correction data, and
      control an operation of the display based on the corrected illuminance value.

2. The display device of claim 1, wherein the IR sensor comprises a light emitting device and a light receiving device,
   wherein the processor is configured to calculate the reflectance of the floor surface by comparing an amount of light projected from the light emitting device to the floor surface with an amount of light incident to the light receiving device,
   wherein the correction data is an equation including the correction parameter which is determined according to the calculated reflectance and the illuminance value, and
   wherein the equation is lux'=a*lux+b (lux representing illuminance value, lux' representing corrected illuminance value, and a and b representing correction parameter determined according to the reflectance).

3. The display device of claim 1, wherein the processor is configured to adjust a brightness value of the display based on the corrected illuminance value.

4. The display device of claim 1, wherein the processor is configured to turn off the display device based on the corrected illuminance value being less than or equal to a pre-set threshold while the display device is in a turn on state, and
   turn on the display device based on the corrected illuminance value exceeding the pre-set threshold while the display device is in a turned off state.

5. The display device of claim 1, further comprising:
   an audio processor,
   wherein the processor is configured to control, based on the display device being identified as a wall mounted type based on the calculated reflectance, the audio processor to convert an output attribute of sound data in an input content as a first attribute, and control, based on the display device being identified as a stand type based on the calculated reflectance, the audio processor to convert the output attribute of the sound data in the input content as a second attribute.

6. The display device of claim 1, further comprising:

a plurality of speakers provided to the display device, wherein the processor is configured to output, based on the display device being identified as a wall mounted type according to the calculated reflectance, sound data of an input content through at least a first speaker among the plurality of speakers, and output, based on the display device being identified as a stand type according to the calculated reflectance, the sound data of the input content through at least a second speaker among the plurality of speakers.

7. A sensor device, comprising:

an illuminance sensor disposed to face along a first direction;

an IR sensor disposed to face along a second direction which is perpendicular with the first direction, the IR sensor comprising a light emitting device and a light receiving device;

a case configured to support the illuminance sensor and the IR sensor;

a connector formed at a side of the sensor device opposite a side from which the IR sensor faces along the second direction, the connector being formed to allow the sensor device to couple to a lower side of an external display device from an outer surface of the case; and an interface configured to transfer, while coupled to the external display device through the connector, a sensing value of the illuminance sensor and light projected from the light emitting device to a floor surface and light incident to the light receiving device to the external display device, wherein an illuminance value obtained from sensing by the illuminance sensor is corrected according to correction data including a correction parameter corresponding to a reflectance calculated based on a sensing value of the IR sensor.

8. The sensor device of claim 7, further comprising:

a memory to store correction data set by respective reflectance; and a processor configured to:

calculate a reflectance of a floor surface, in an environment in which the display device is arranged, based on a sensing value of the IR sensor, obtain correction data corresponding to the calculated reflectance from stored correction data of the memory, correct an illuminance value sensed in the illuminance sensor according to the obtained correction data, and transfer the corrected illuminance value to the external display device through the interface.

9. A control method of an operation of a display device comprising an illuminance sensor, the method comprising:

obtaining an illuminance value by using the illuminance sensor;

obtaining a sensing value of an IR sensor disposed at a lower side of the display device;

calculating a reflectance of a floor surface, in an environment in which the display device is arranged, based on light projected from a light emitting device included in the IR sensor to the floor surface and light incident to a light receiving device included in the IR sensor;

obtaining correction data corresponding to the calculated reflectance from among pre-stored correction data, and correcting the illuminance value obtained from sensing by using the illuminance sensor according to a correction parameter corresponding to the calculated reflectance in the obtained correction data; and controlling an operation of the display device according to the corrected illuminance value.

10. The control method of claim 9, wherein the calculating of the reflectance of the floor surface comprises:

calculating the reflectance of the floor surface by comparing an amount of light projected from a light emitting device to the floor surface from among the IR sensor with an amount of light incident to a light receiving device from among the IR sensor, wherein the correction data is data on an equation including the correction parameter which is determined according to the calculated reflectance and the illuminance value, and wherein the equation is lux'=a*lux+b (lux representing illuminance value, lux' representing corrected illuminance value, and a and b representing correction parameter determined according to the reflectance).

11. The control method of claim 9, wherein the controlling of the operation of the display device comprises adjusting a brightness value of the display based on the corrected illuminance value.

12. The control method of claim 9, wherein the controlling of the operation of the display device comprises:

turning off the display device based on the corrected illuminance value being less than or equal to a pre-set threshold while the display device is in a turn on state; and turning on the display device based on the corrected illuminance value exceeding the pre-set threshold while the display device is in a turned off state.

13. The control method of claim 9, further comprising:

converting an output attribute of sound data in an input content as a first attribute based on the display device being identified as a wall mounted type based on the calculated reflectance; and converting the output attribute of the sound data in the input content as a second attribute based on the display device being identified as a stand type based on the calculated reflectance.

14. A computer readable recording medium storing a program to execute a control method of an operation of a display device which comprises an illuminance sensor, the method comprising:

obtaining an illuminance value by using the illuminance sensor;

obtaining a sensing value of an IR sensor disposed at a lower side of the display device, the IR sensor comprising a light emitting device and a light receiving device;

calculating a reflectance of a floor surface, in an environment in which the display device is arranged, based on light projected from the light emitting device to the floor surface and light incident to the light receiving device;

obtaining correction data corresponding to the calculated reflectance from among pre-stored correction data, and correcting the illuminance value obtained from sensing by using the illuminance sensor according to a correction parameter corresponding to the calculated reflectance in the obtained correction data; and controlling an operation of the display device according to the corrected illuminance value.

15. The computer readable recording medium of claim 14, wherein the calculating the reflectance of the floor surface comprises calculating the reflectance of the floor surface by comparing an amount of light projected from a light emitting device to the floor surface from among the IR sensor with an amount of light incident to a light receiving device from among the IR sensor,
- wherein the correction data is data on an equation including the correction parameter which is determined according to the calculated reflectance and the illuminance value, and
- wherein the equation is lux'=a*lux+b (lux representing illuminance value, lux' representing corrected illuminance value, and a and b representing correction parameter determined according to the reflectance).

* * * * *